PULSE CODE MODULATION TRANSMISSION

Filed March 22, 1946

3 Sheets-Sheet 1

INVENTOR
F. B. LLEWELLYN
BY William F. Simpson.
ATTORNEY

Jan. 22, 1963 F. B. LLEWELLYN 3,075,147

PULSE CODE MODULATION TRANSMISSION

Filed March 22, 1946 3 Sheets-Sheet 2

INVENTOR
F. B. LLEWELLYN
BY William F. Simpson.
ATTORNEY

PULSE CODE MODULATION TRANSMISSION

Filed March 22, 1946 3 Sheets-Sheet 3

INVENTOR
F. B. LLEWELLYN
BY William F. Simpson.
ATTORNEY 3,075,147
Patented Jan. 22, 1963

3,075,147

PULSE CODE MODULATION TRANSMISSION

Frederick B. Llewellyn, Summit, N.J., assignor to Bell Telephone Laboratories, Incorporated, New York, N.Y., a corporation of New York Filed Mar. 22, 1946, Ser. No. 656,485
16 Claims. (Cl. 325—43)

This invention relates to improvements in communication systems for the transmission of complex wave forms of the type encountered in speech, music, sound, mechanical vibrations, picture transmission, television, and telegraph.

Communication systems have been devised in which complex waves may be transmitted and reproduced with high fidelity over an electrical transmission path in such manner that the signal-to-noise ratio of the received signal is substantially improved over the signal-to-noise ratio when the wave is modulated directly onto a carrier. Such advantages have been obtained by representing the amplitude of the complex wave to be transmitted at successive instants by means of code groups of pulses. These pulse code groups are then transmitted and at the receiving station means are provided for recovering the complex wave form from the transmitted code groups.

It is an object of the present invention to provide an improved communication system for the transmission of complex wave forms in which pulse code groups are utilized for transmitting intelligence over the transmission path.

In previous pulse code transmission systems, the coding arrangements for rapidly representing the magnitude of a sample of an electrical wave or electrical quantity by means of a group of pulses have employed a code in which the pulses of a code group are arranged in accordance with binary numbering or counting systems. In other words, each code group of pulses comprises a fixed number of pulses or pulse positions and the pulses present in each position may be one or the other of two different types. Thus each pulse position may be considered equivalent to the denominational order of a binary number, one type of the pulses being equivalent to or representing the zeros and the other type of pulse representing the ones of the number.

In the prior art systems the pulses of each code group thus represent the magnitude of the sample just as the numerals of a binary number represent the magnitude defined by the number.

It is a further object of the present invention to provide a coding system whereby the code groups representing adjacent sample amplitudes are not in any way related to one another as in the case of the binary number code system referred to above.

Another object of the invention is to provide means for readily and rapidly changing the code thereby to provide a greater degree of privacy and some secrecy for the transmitted signals.

In one aspect the invention relates to a transmission system in which a complex wave form to be transmitted is sampled at definite intervals and the sample amplitudes are represented by groups of code pulses, the arrangement of the pulses in the group bearing an arbitrary relationship to the amplitudes.

Another aspect of the invention relates to methods of and apparatus for decoding arbitrarily coded pulse code groups after transmission to permit recovery of the corresponding complex wave at a receiving station.

A feature of the invention relates to arrangements for rapidly changing the code in accordance with which the amplitudes of a complex wave form are represented by arbitrary pulse groups.

Another feature of the invention relates to a compensating arrangement characteristic of the arbitrary code utilized at the transmitting station for use at the receiving station to permit recovery of transmitted intelligence.

A further feature of the invention relates to a cathode-ray or electron discharge tube in which the magnitude of the signals or complex wave to be transmitted is employed to deflect the electron beam in one direction by an amount which is a function of or under the control of the amplitude of the complex wave to be transmitted. Other means are provided for sweeping the beam in a direction substantially at right angles to the deflections caused by the signal for generating a code group of successive pulses representative of the extent of the first deflection.

Still another feature of the invention relates to methods of and apparatus for automatically and rapidly translating groups of code pulses arranged in accordance with one code into new groups of code pulses arranged in accordance with another code which is independent of the first code.

An additional feature of the invention resides in the transmission of received signals coded in accordance with one arbitrary code through a second cathode-ray tube similar to the coding cathode-ray tube at the transmitting station, but equipped with a compensating arrangement, to translate each of the code groups of the signal into a different code group of pulses in which the individual pulses are arranged in accordance with a binary number system representative of each of the code groups.

Other features of the invention relate to a sampling circuit arrangement for sampling a complex wave at frequent intervals of time, for setting up code representations of the samples, and for transmitting coded information to a remote point and to means for receiving such transmitted information, decoding it and finally transmitting it to yield a wave form which reproduces with high fidelity the original complex wave.

Briefly, in accordance with the present invention, equipment is provided for generating equally spaced control pulses at a relatively high pulse repetition frequency. Each pulse is applied in a circuit arrangement which takes an instantaneous sample of the complex wave to be transmitted and stores a voltage equal or proportional to the instantaneous amplitude of the complex wave. This sample amplitude voltage is applied to one pair of deflecting plates, such as the vertical plates, of a cathode ray tube displacing the electron beam by an amount proportional to the instantaneous voltage. At substantially the same time that the sample becomes available on the vertical plates, the electron beam is caused to sweep across the face of the cathode ray tube. The tube is supplied with a mask which may be placed over its face with perforations therein such that as the beam sweeps across the usual fluorescent screen light therefrom is transmitted through the perforations forming "on" and "off" pulses of light.

The mask referred to above is arranged with a plurality of horizontal rows of perforations arranged one above the other. Perforations in each of the horizontal rows determine the light pulses transmitted through the mask when the electron beam is positioned opposite that row. When the electron beam passes over a perforation, light is transmitted through the mask causing an "on" pulse. When the electron beam passes behind the mask no light is transmitted through it; consequently an "off" pulse is formed.

It is possible to arrange perforations in the various rows in any arbitrary manner so long as perforations are not the same in any two rows. In this manner, the respective amplitudes of electron beam deflections corresponding to the amplitude of the successive samples may be represented by an arbitrary code in which neither the code nor the pulses of the code groups bear any fixed or systematic relation to the respective amplitudes.

In accordance with a simplified arrangement embodying features of the present invention, the mask is arranged with perforations in the respective rows representative of pulses which may be considered similar or equivalent to binary numbers representing the amplitude of the sample. In the specific mask employed the perforations represent the ones, while the opaque portions of the mask in each row represent the zeros of the corresponding binary numbers. Of course, the mask could be arranged so the perforations would represent zeros and the opaque portions ones. Furthermore, in accordance with the simplified arrangement, pulses representing the lowest denominational order of the binary numbers are transmitted first and then the pulses representing digits of the successively higher denominational orders are transmitted in succession. In either case the "off" and "on" pulses of light produced by the mask may then be used in any manner to initiate a corresponding code group of "off" and "on" current pulses to be transmitted to a remote point. Specifically, in one form of this invention a lens is used to produce an image of the cathode ray tube screen on a photoelectric cell. The output of this cell may then be amplified to as high a degree as desirable and transmitted over a suitable transmission path directly, or may be used to modulate a carrier frequency current, such as by turning a radio transmitter on or off.

At a receiving point, after detection if necessary, the groups of pulses, one group for each sample, are impressed on a condenser circuit subject to logarithmic decay which for each pulse group builds up a voltage representative of the amplitude of the sample taken at the transmitter. This condenser charge may be used directly or may be applied to an amplifier which is "gated" or caused to become operative only at instants of time just following the completion of transmission of a pulse group representing the magnitude of a sample.

When the simplified mask is employed at the transmitter the output of the gated amplifier may be transmitted through a suitable low-pass filter which, in effect, suppresses the higher-frequency components of these pulses with the result that the output of this filter is a wave form which is substantially the same as that of the complex wave at the transmitting station.

When it is desired to employ an arbitrary code by using any other suitable mask at transmitter, the output of the gated amplifier is employed to control the signal deflection of a second cathode ray tube similar to the tube employed at the transmitting station. In this case a compensating mask is employed in front of the second cathode ray tube to translate arbitrary code employed at the transmitting station into a binary number code of the type described above with reference to the simplified system. The output of this second tube then is applied to a second condenser and resistor combination across which is built up a voltage which is a function of the amplitude of the sample of the transmitter. This voltage is then employed to reconstruct the complex wave as described above.

The above, as well as additional features of the invention, will be better understood by reference to the following description taken with the accompanying drawings, in which.

Figures 1, 2:
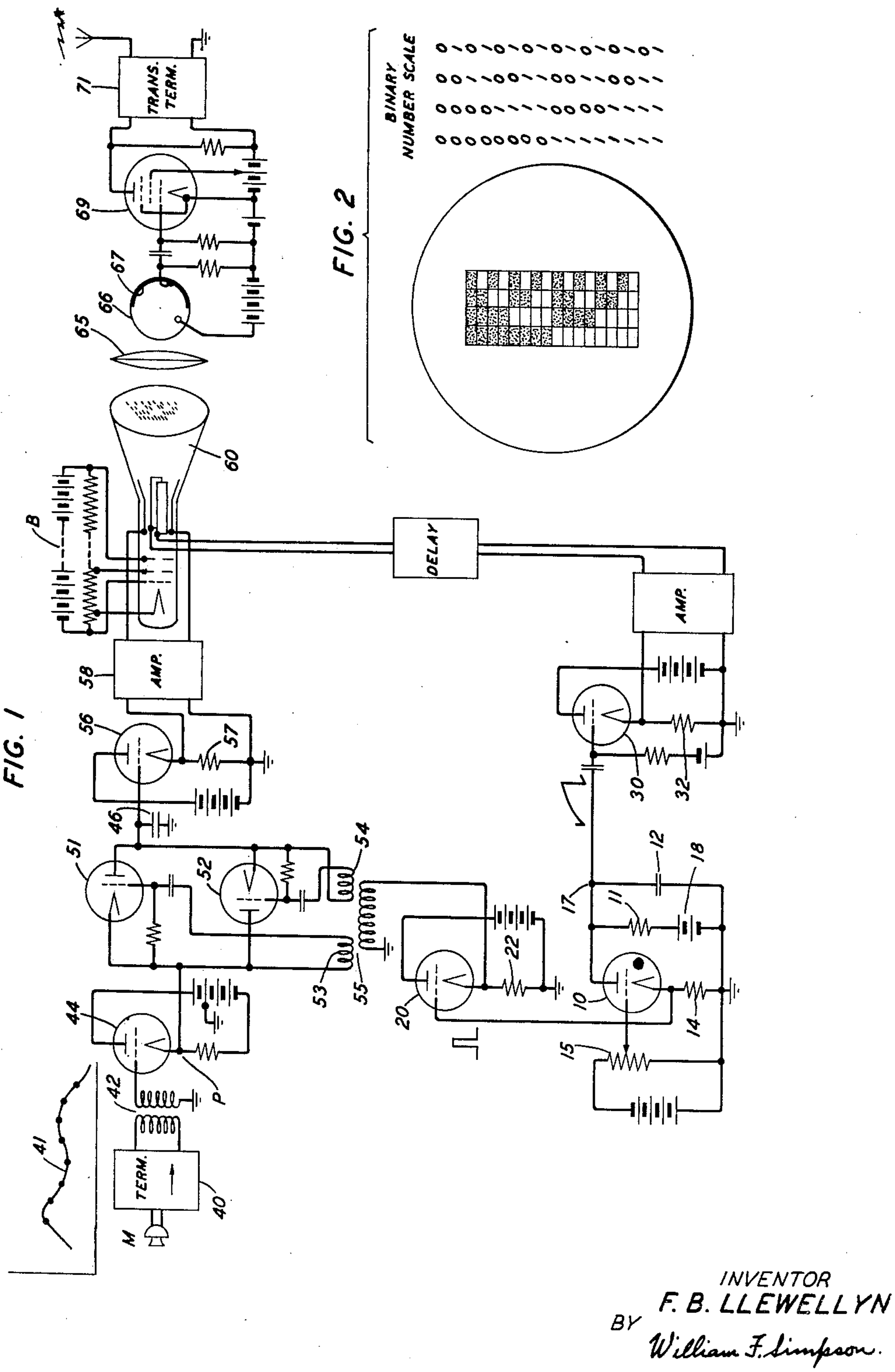
FIG. 1 shows a circuit with the essential elements for carrying out my invention at the transmitting end of a communication system.
FIG. 2 shows in further detail the nature of the mask utilized for coding sample amplitudes into binary code groups in the simplified system referred to above.

In order to facilitate the description and understanding of the exemplary systems embodying the present invention, the simplified system will be described first. Furthermore, since the various operations in the system are initiated and controlled by a control pulse generator, the operation of the exemplary system shown in the drawing may be more readily understood if the operation of this generator is described first.

Referring then to FIG. 1, there is shown a relaxation oscillator comprising a gas tube 10 and associated circuit elements. This relaxation oscillator is of a form well known in the art and includes a resistor 11 through which a condenser 12 may be charged. Assuming that, to start with, the condenser 12 is discharged then on closure of the circuit it is charged at a rate determined by resistor 11. When the potential of the condenser and the plate of the tube rises to a "firing" value, the condenser suddenly discharges through the tube and resistor 14. The discharge is of short duration and gives rise to a sharp positive pulse across resistor 14. The duration of this pulse and the interval after which it is followed by an identical pulse can be completely controlled by varying the parameters of the circuit; such as by varying the values of the elements 11, 12 and 14 and by varying the voltages or potentials applied to the tube 10, as for example, the potential of the grid of tube 10 as determined by the potentiometer 15. While any of several forms of oscillator circuits may be used to generate the control pulses, the relaxation oscillator shown is simple and satisfactory. Its operation is more fully described in many places such as on page 184 of "Ultra-High Frequency Technique" by Brainard et al., published by D. Van Nostrand and Company, 1942.

The positive pulse formed at 14 is now used to control the emission of timing and control pulses for various parts of the circuit. In particular, the pulse is transferred directly to the grid of a triode 20 giving rise to a similar positive pulse across the cathode resistor 22, to be used as hereinafter described. The charging of the condenser 12 raises the potential of the point 17 gradually along a logarithmic or exponential curve and by suitable adjustment of the capacitance of the condenser 12, the resistance of resistor 11, and the voltage of battery 18, the rise of potential at 17 may be made substantially linear over the essential operating range. This potential is applied to the grid of tube 30 where it gives rise, across cathode resistor 32, to a similar rising voltage of the sawtooth form commonly and advantageously used for the sweep circuit of many well-known oscilloscope circuits being here applied in a manner to be described.

Of course, any other of the many known arrangements for generating substantially linear sawtooth wave forms suitable for cathode ray sweep deflections may be employed, in place of the exemplary arrangement shown, when it is so desired.

The parameters of the relaxation oscillator may be adjusted so that pulses are derived across resistor 14 at any frequency or repetition rate desired, this usually being the frequency at which the complex wave is to be sampled. For the purpose of my invention it is preferred to have a sampling frequency higher than that of the highest frequency component in the complex wave to be transmitted. More specifically, it is desirable to have a sampling frequency such that at least two samples are taken per cycle of the highest frequency component of the complex wave. If, for example, this wave is to be a speech wave and it is desired to transmit all components up to 4,000 cycles, then a suitable value for the relaxation oscillator frequency would be 8,000 cycles although a higher value may be used if desired.

Referring now to the upper portion of FIG. 1, there is shown a source of an electric signal wave to be transmitted such as a microphone M and terminal equipment 40, the output of which will yield a complex wave, a small portion of which is indicated at 41. After suitable amplification and transmission through transformer 42, the wave may be impressed on the input circuit of an amplifier comprising vacuum tube 44 connected as a cathode follower. The point P will then be subject to potential variations in accordance with the signal wave and instantaneous values of this potential are to be transferred to a storage condenser 46. To this end there is shown a circuit comprising tubes 51 and 52 connected in opposite directions, the input circuits of which are both subject, through the secondaries 53 and 54 of transformer 55, to the action of a positive pulse from vacuum tube 20. During the presence of this short positive pulse, tubes 51 and 52 will be conducting and will conduct in such fashion as to make the potential across condenser 46 equal to that existing at point P at the time of the pulse; whether the condenser potential was initially above or below that at point P. Between control pulses from tube 20 the potential across condenser 46 will remain substantially unchanged. Tubes 51 and 52 and their related circuits and equipment are sometimes called a "clamp" circuit.

After suitable amplification, the potential on condenser 46 is used to deflect the beam of a cathode ray tube 60. Many known circuit arrangements for this will be suitable. Here the potential across condenser 46 is applied to the grid of vacuum tube 56 connected as a cathode follower and the output voltage across the cathode resistor 57 is then transferred to amplifier 58. The output voltage of the amplifier may then be applied to give a vertical deflection to the electron beam in the cathode ray tube.

The cathode ray tube and circuit may take on any of the known forms commonly referred to as oscilloscopes, and utilizing either electrostatic or magnetic deflection. It is here shown as having an electrostatic deflection system and as receiving the saw-tooth pulse from vacuum tube 30 to be used in a linear sweep circuit for deflecting the electron beam in the horizontal direction. The cathode ray tube circuit is shown in simplified form as including the necessary sources of voltage B with arrangements for bringing appropriate voltages to cathode, control grid and anodes.

In front of the face or screen of the cathode ray tube is positioned a lens 65 which is arranged to produce an image of the cathode ray screen on the sensitive surface 67 of a photoelectric cell 66. Over the face of the oscilloscope, either inside or outside the tube, but conveniently outside is placed a mask. A mask suitable for use in the simplified arrangement is shown in further detail in FIG. 2. The mask carries horizontal groups of perforations coinciding with the numbers of the binary scale, the vertical position of each group being determined by the binary number represented thereby, all of which will be evident from inspection of the drawing of the mask taken with the binary number scale shown to the right of the mask in FIG. 2. A four-digit number scale is shown for illustration and it will be noted that it permits recognition of sixteen different amplitudes. A five-digit number scale permits recognition of thirty-two different amplitudes, etc. With each sample, the electron beam of the oscilloscope is deflected in a vertical direction by an amount proportional to the amplitude of the sample voltage on the condenser 46 and immediately thereafter, while the vertical deflection is maintained by the clamp circuit referred to above, the oscilloscope is triggered for a horizontal sweep. Conveniently, and for reasons which will appear in connection with the receiver, the horizontal sweep is from right to left across the mask as shown in FIG. 2. Thus, for example, if the sample had zero amplitude, the fluorescent spot produced by the electron beam would move horizontally across the top row of the binary number scale of the mask which, it is seen, contains no perforations and, therefore, no light would appear through the mask on the face of the oscilloscope. If the amplitude of the sample corresponded to the binary number 1 then the spot would pass horizontally over the second row from the top in the perforated mask so that the light would appear in the perforation corresponding to the first denominational order, the sweep in this case being from right to left in FIG. 2. For other amplitudes the spot would pass across rows located farther down in the mask and yield resulting code groups of light pulses in accordance with the units and zeros of the binary scale. Thus, if the signal amplitude is 11 then the sweep would be, from right to left, across the twelfth row giving the code group 1101, this corresponding to the binary number 1011 read in the reverse direction.

The pulses of light falling on the photocell would then give rise to current pulses in its circuit and the output of an amplifier tube 69 associated therewith accordingly would consist of a group of electrical pulses arranged to correspond with the passage of the light spot of the oscilloscope across the openings in the mask. The original wave is thus translated into a series of pulse code groups, the arrangement of the pulses comprising successive groups being in one-to-one correspondence with the successively sampled amplitudes of the wave. The resulting video pulses may then be transmitted directly over a suitable transmission channel or may be used to control the transmission of power of a different form. In this instance, for example, the pulses are shown as arriving at a transmitter terminal 71 of a radio station where they may be used to modulate carrier or radio frequencies or to turn off and turn on transmission over a radio path which may include coaxial cables, wave guides, etc.

The radio channel or path may be in any frequency range which provides a proper band width including point-to-point channels in the microwave region.

Figures 3, 4, 5:
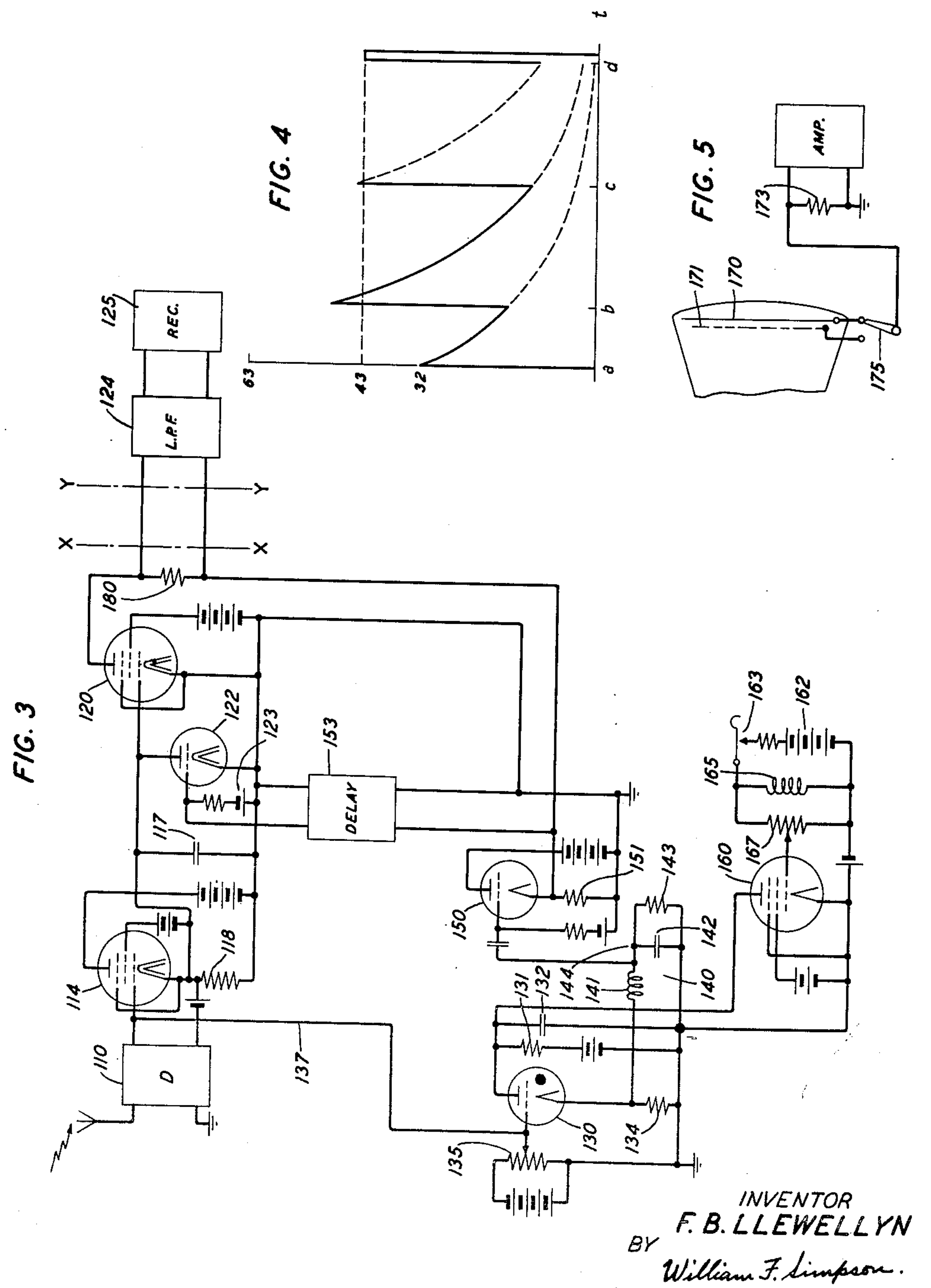
FIG. 3 is a circuit diagram of a receiver which may be used to recover transmitted intelligence when binary code groups are employed.
FIG. 4 is explanatory of the operation of the receiver circuit.
FIG. 5 is representative of a modification of certain portions of the transmitting equipment of FIG. 1.

FIG. 3 shows a circuit for translating the pulse code groups received at a remote point back into the original signal wave. The incoming signal wave, if on a radio carrier, is detected or otherwise converted back into the video pulses corresponding to the output of the photocell 66 of FIG. 1. Such apparatus is indicated by the box 110 which would comprise suitable detectors and clipping amplifiers. These received video pulses then pass through an amplifier, here indicated by the pentode tube 114, and are employed to charge condenser 117 which is connected in an RC circuit which includes the condenser 117 and a load resistor 118. The time constant of the RC circuit is so adjusted that any charge on the condenser will decay to half its value in the time corresponding to one digital pulse associated with the code group for a sample. This is illustrated in FIG. 4 in which it is assumed that a six-digit code is in use and that the sample voltage is forty-three units. This would correspond to a binary number 101011. If the smallest digit corresponds to one, then the largest in this six-digit code would correspond to thirty-two units. The beam of the oscilloscope sweeps from right to left as already pointed out. Tube 114 is so operated that it constitutes essentially a constant current source, and, therefore, the charge delivered by it to condenser 117 is substantially independent of the charge already on the condenser and is proportional to the pulse voltage on the grid of the tube and to the duration of the pulse. Since these quantities are the same for all the pulses, the charge added to the condenser and, therefore, the increase in its voltage from each pulse is the same. Thus for the particular number 43 illustrated in FIG. 4, as the beam transmits the pulse corresponding to the digit on the right of the binary number, the potential of the condenser will be raised thirty-two units at the time *a* of FIG. 4. The magnitude of the units of charge supplied by each pulse will, of course, determine the magnitude of the output signal. At the time corresponding to the arrival of the pulse representing the second digit from the right, time *b* in FIG. 4, the potential of the condenser will have decayed to one half of its value (i.e., to 16) but at this moment the second pulse raises the potential by thirty-two units to 48. In the next period this will have decayed to 24 and inasmuch as no pulse arrives for this third digital position from the right, it will continue to decay and at the end of the next interval will have fallen to 12. At this instant, time *c* in FIG. 4, the pulse for the fourth digital position from the right arrives lifting the potential by 32 units to 44. No pulse arrives for the next or fifth digital position from the right and, therefore, the potential decays for two periods to 11 units whereupon the pulse for the sixth or final digital position from the right, or the first digit on the left, arrives lifting the potential to 43, the number corresponding to the amplitude of the sample as illustrated at time *d* in FIG. 4. It will be observed that if the first pulse were allowed to decay alone for five units of elapsed time there would be a potential on the condenser of one. Also had the second pulse alone been impressed on the condenser and allowed to decay there would have been, due to it, at the end of the cycle, a potential of 2. Similarly, the pulse arriving at the fourth period if impressed on the condenser alone would decay in two periods to 8. The last one arriving at the sixth period would have no time to decay. The sum of these individual voltages, it will be noted, also adds up to 43. This, of course, should be apparent for the reason that in this circuit the principle of superposition is operative. The coding circuit described above is similar to that disclosed in copending application Serial No. 649,347 filed February 21, 1946 in the names of B. M. Oliver and C. E. Shannon.

At the time of arrival of the last pulse an amplifier tube 120, the input circuit of which is connected across the condenser 117, is "gated" or caused to become active by the arrival of an activating pulse hereinafter described. There will thus be a flow of current in the output circuit of amplifier tube 120 proportional to the potential on the condenser 117. A second "gate," comprising a vacuum tube 122, is employed to discharge condenser 117 just after the activating pulse has terminated.

The successive series of code pulse groups give rise to corresponding pulses in the output of tube 120, one for each pulse group, that is, for each sample, at the transmitter station. These pulses are passed through a low-pass filter 124 and into receiving terminal equipment 125 in which there is then reproduced the original complex wave.

The circuit arrangement for the amplifier gating operations will now be described. A relaxation oscillator circuit, which may be similar in every respect to the relaxation oscillator at the transmitter, is incorporated in the receiver and it is shown as comprising a gas tube 130, resistor 131, condenser 132, cathode resistor 134 and potentiometer 135. This circuit is adjusted by variation of its parameters to have a natural pulsing frequency of substantially the same value as that of the oscillator at the transmitting station. It is synchronized with the transmitter station on the arrival of the first pulse of the code group for a sample, this being accomplished by the connection of a conductor 137 from a suitable point such as the output of the terminal equipment 110 to the grid of gas-filled tube 130. As pointed out in connection with the oscillator at the transmitting station, a positive pulse of short duration is set up across the cathode resistor 134 for each cycle of the oscillator. Associated with that resistor is a delay network 140 comprising the inductor 141 and a condenser 142. The delay circuit is terminated by a suitable impedance 143 to suppress any reflected wave. A conductor from the point 144 of the delay circuit goes to the grid of an amplifier tube 150, which is operated as a cathode follower, as a result of which a corresponding positive pulse appears across the cathode resistor 151. This resistor is included in and serves as the source of power for the output circuit of amplifier tube 120. The delay of the time delay circuit is such that the pulse will appear across resistor 151 to activate tube 120 immediately after the arrival of the last pulse in the code group and thus performs the "gating" operation referred to.

Vacuum tube 122 connected across the terminals of condenser 117 is normally biased well beyond cut-off by battery 123 connected in the grid return; however, a positive pulse arriving on its grid will render it substantially a short-circuit across the condenser. This pulse should arrive on the grid of 122 immediately after the completion of the gating pulse applied to amplifier tube 120. To this end the pulse may be derived also from the cathode resistor 151, being delayed a suitable amount by the delay network 153. With the application of this pulse the condenser is discharged, as shown at the right-hand side of FIG. 4, and the circuit is then ready for the series of pulses representing the code group for the next sample.

It was stated above that the relaxation oscillator tube 130 would be triggered at the beginning of a code group pulse series. For some of the codes the first denominational order will be occupied by an "off" pulse or signal and no pulse will arrive. In this case and also in the relatively rare event that the code group comprises nothing but "off" signals, it will be recognized that the oscillator must be closely enough adjusted to the frequency of the transmitter oscillator so it will continue triggering itself with sufficient accuracy for several cycles, pending the arrival of a series which will contain the appropriate triggering pulse. Also, since all the pulses of a code group arriving at the receiver have the same characteristic as to amplitude and duration, any of these will be able to trigger the receiver oscillator and thus synchronize it in an improper phase. In general the first pulse to arrive will not be in the first position in a code group and the resulting signals or messages at the receiver will not be intelligible. It is desirable then to provide a means to bring the receiver oscillator into proper synchronism with the received signals. Such a means is shown in the lower portion of FIG. 3 and comprises a vacuum tube 160, here shown as a pentode. Its output circuit is then connected across condenser 132. Its input circuit comprises a battery 162 and a key 163 in series, and an inductor 165 paralleled by a potentiometer 167. Tube 160 is normally biased so that substantially no current flows in its anode or output circuit. On closure of the key 163 a substantial voltage appears across inductor 165 which voltage, however, rapidly falls as current therethrough becomes established. The connection is such that the positive end of the inductor, operating through potentiometer 167, impresses a positive voltage on the grid of pentode 160 for a moment only. During this interval a charge will be withdrawn from condenser 132 delaying the time when tube 130 is again ready to be triggered off. The magnitude of the pulse applied to the grid of vacuum tube 160 is adjusted so that the delay is triggering of tube 130 is approximately one-fourth of the cycle period for a four-digit code, or one-sixth of that period for a six-digit code, that is, about one digital period. By a few taps of key 163 the triggering of tube 130 may be brought into the proper timed relation with the arrival of the pulse code groups, this condition being indicated by the fact that the signals or message then become intelligible. The opening of key 163 will give rise to a reverse voltage over inductor 165 but this has no effect inasmuch as its drives the grid of pentode 160 to a negative value.

As pointed out above, it is possible to use any arbitrary code of pulses representing the various amplitudes of the sample, instead of the binary number code described above. In the binary number code each of the successive code groups representing successively larger samples are related to the adjacent code group representing adjacent sample magnitudes in an orderly and systematic manner similar to the manner in which adjacent numbers in the binary number systems are related to each other. In addition, in such a code the corresponding individual pulses of each code group represent the same portion of the total possible magnitude which may be represented by any code group and the magnitude represented by any code group is the sum of such portions represented by the individual pulses thereof. In an arbitrary code neither of the above relationships between the adjacent code groups nor the relationship between the individual pulses and the magnitude represented by the complete code group exists.

Figure 7:
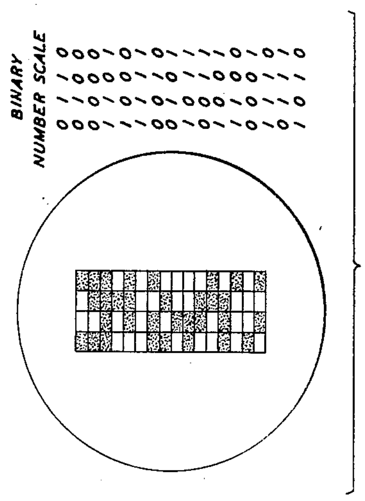

When it is desired to use any such code, a mask in accordance with the desired code is substituted for the binary number mask referred to above in front of the transmitting cathode ray tube. A mask perforated in accordance with any desired code may be employed. Inasmuch as the various code groups are the same as in the binary number masks described above but are arranged in different orders with respect to their relative positions one above the other, the resultant code may be called "permutated binary number code." This language is sometimes employed herein to refer to any arbitrary code arrangement. One coding mask in accordance with an arbitrary counting system is shown in FIG. 7 together with the corresponding binary numbers.

Considering the operation of the transmitting equipment when such an arbitrary or permutated binary code mask is used, it will be seen that the binary numbers, which correspond in the manner described above to transmitted pulse code groups each representing a sample amplitude, will no longer be proportional to or a function of the actual amplitudes of the corresponding samples. If, for example, the complex wave form to be transmitted were such that sample voltages of magnitudes 2, 6, 9 and 10 are applied to the sample deflection circuit of cathode ray tube 60 in FIG. 1, the action of the permutated code mask of FIG. 7 would be such that pulse code groups corresponding to the following binary numbers would be transmitted 0, 2, 3 and 9. The communication system is thus given the elements of a privacy or secrecy system. It will be understood that any arbitrary permutation code or arbitrary permutation of the normal binary number code may be used in the preparation of the modified coding mask and that all that is necessary to alter the code to be transmitted is to change masks.

The operation of the receiver shown in FIG. 3 and described above in response to the arbitrary coded pulses will produce pulses having magnitudes which are proportional to the binary numbers corresponding to the pulse groups instead of a function of the magnitude of the samples represented by the pulse groups. If these pulses are applied to a low-pass filter, the complex wave appearing at the output thereof will not be a reproduction of the original complex wave presented for transmission.

Figure 6:
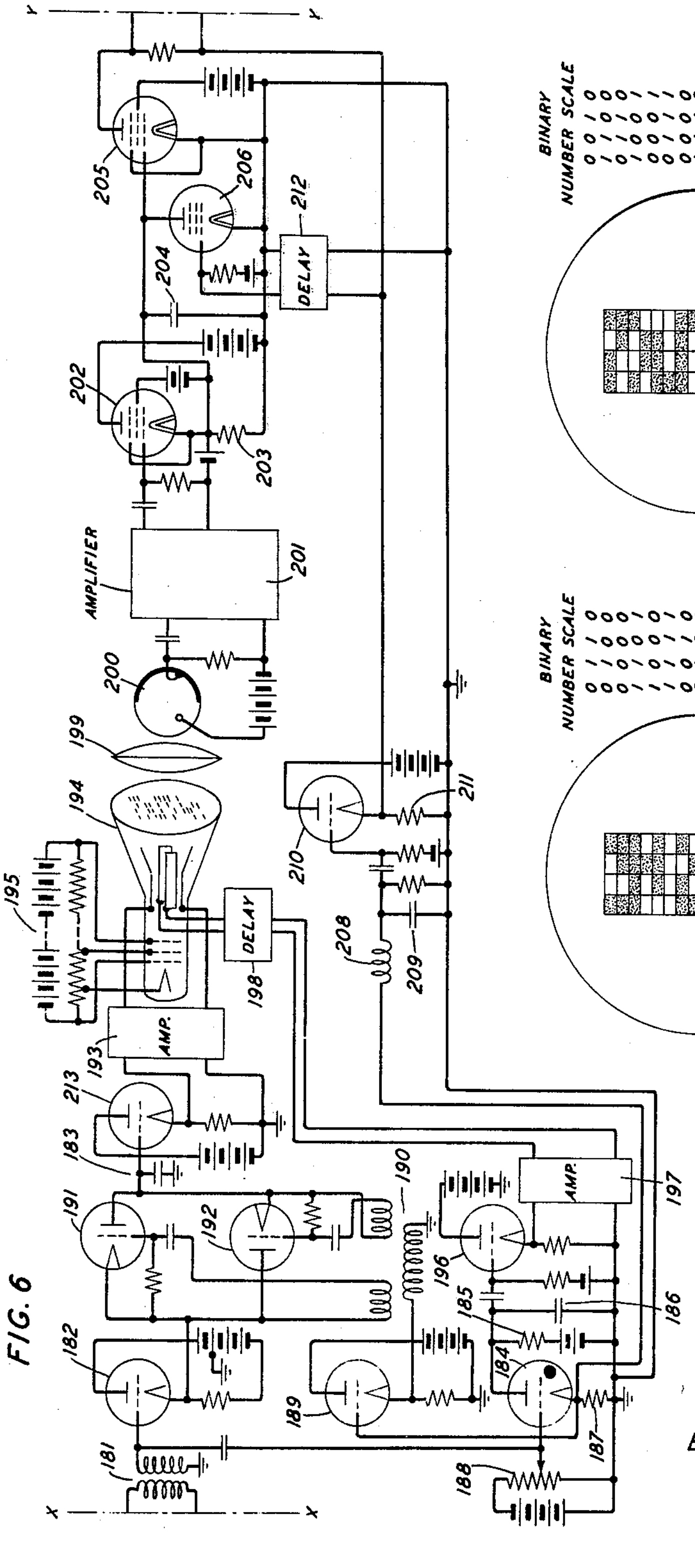
FIG. 6 shows additional circuit elements to be inserted between the lines X—X and Y—Y of the receiver of FIG. 3 to transform the system into one having secrecy features.

Accordingly, the elements shown in FIG. 6 are inserted between the lines XX and YY of FIG. 3. Briefly, this additional equipment comprises a second cathode ray tube with associated circuits similar to those utilized in the transmitter, a correcting mask mounted over the screen of the cathode ray tube and perforated in such a way that deflections of the electron beam of the cathode ray tube in response to the permutated sample amplitude pulses as produced across resistor 180 (FIG. 3) by the translating circuit result in pulses representative of the actual sample amplitudes as applied to the deflection circuit of cathode ray tube 60 of the transmitter shown in FIG. 1. A photoelectric cell circuit similar to that of FIG. 1 is utilized to obtain current pulses which are then applied to an RC translating circuit identical to that of the receiver in FIG. 3. The output pulses therefrom are applied to the low-pass filter 124 and the receiver terminal equipment 125 to recover the original complex wave.

Considering the operation of the modified receiver in more detail, it will be understood that through the operation of the RC translating circuit there will appear across resistor 180 (FIG. 3) a series of pulses occurring at the sample frequency and having amplitudes representative of the permutated sample amplitudes. These pulses are applied through a transformer 181 (FIG. 6) to a cathode follower stage 182 and are duplicated across the cathode resistor thereof. As in the case of the transmitting equipment (FIG. 1) these pulses are transmitted through a clamp circuit to control the potential on condenser 183.

Timing pulses for the clamp circuit which is indentical to that of FIG. 1 are produced by a relaxation oscillator comprising gas-filled tube 184, resistor 185, condenser 186, cathode resistor 187, potentiometer 188 and associated sources of operating potential. Conveniently this oscillator may be identical to that shown in FIG. 1 although it will be understood that many other oscillators or pulse generators may be used for the same purpose. In any event, the parameters of the oscillator are so chosen that its natural pulsing frequency is substantially the same as the sampling frequency, in this case 8,000 pulses per second. This oscillator is synchronized with oscillator 10 at the transmitter and oscillator 130 of the receiver of FIG. 3 by applying the signal appearing across the primary winding of transformer 181 (FIG. 6) to the control grid of the gas-filled tube 184.

The positive pulses appearing across cathode resistor 187 of oscillator tube 184 are transmitted through a cathode follower stage 189 to the primary winding of transformer 190 through which they are utilized to control the operation of the clamp circuit which comprises vacuum tubes 191 and 192 connected in opposite directions between the output of cathode follower 182 and condenser 183. Accordingly, during the timing pulses applied through transformer 190 to the grids of vacuum tubes 191 and 192, either of the tubes may conduct and the potential at the cathode of cathode follower 182 will be duplicated across condenser 183. Between the timing pulses, the potential across condenser 183 will be maintained substantially constant at the value determined during the preceding timing pulse.

As in the case of the transmitting equipment of FIG. 1, the potential across condenser 183 is applied through a cathode follower 213 and amplifier 193 to control vertical deflections of the electron beam of cathode-ray tube 194, suitable operating potentials for which are provided by a power supply represented generally at 195. The horizontal sweep signal for this cathode-ray tube is obtained from relaxation oscillator 184, the saw-tooth potential across condenser 186 being transferred through a cathode follower stage 196 to a horizontal amplifier 197 and the output from this amplifier being suitably delayed by delay circuit 198 before application to the horizontal deflecting plates of cathode-ray tube 194 to permit completion of the vertical sample deflection before initiation of the horizontal sweep.

It will be recognized that in the operation of the receiving system as thus far described the deflections of the electron beam of cathode-ray tube 194 are in accordance with permutations of the sample amplitude deflections of the electron beam of cathode-ray tube 60 in the transmitter as modified by the coding mask utilized at the transmitter. Thus if the transmitter coding mask is perforated as is shown in FIG. 7, a sample amplitude of zero will result in an electron beam deflection at cathode-ray tube 194 corresponding to the binary number 0110 which is transmitted rather than the binary number 0000 as would have been the case in the normal binary coding arrangement. Reference to FIG. 2 will disclose that 0110 corresponds to the amplitude of 6. Thus for a zero amplitude deflection at cathode-ray tube 60 a deflection of 6 is produced at cathode-ray tube 194. It is necessary in order to recover the original complex wave to convert the permutated amplitude deflections at the cathode-ray tube 194 into pulses proportional to the actual sample amplitudes as applied to cathode-ray tube 60 in the transmitter. This is accomplished through the use of a decoding mask which is positioned in front of the screen of cathode-ray tube 194 and bears horizontal groups of binary-number perforations. These binary number groups of perforations are so arranged vertically that the binary number corresponding to the unpermutated sample amplitude falls for each sample amplitude in the horizontal row to which the electron beam of cathode-ray tube 194 is deflected by the permutated pulse transmitted over the system.

Figure 8:
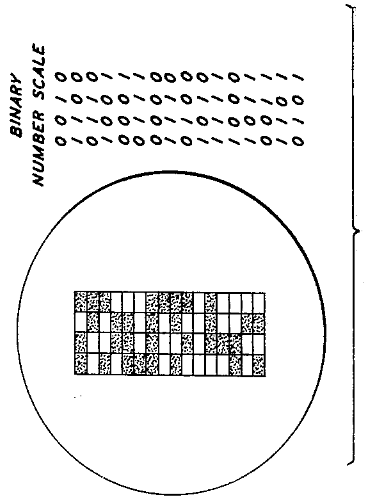
FIGS. 7 and 8 show suitable types of coding and decoding masks for use with the privacy system.

Thus, by way of example, if the coding mask utilized at the transmitter is perforated in accordance with FIG. 7 and as shown in the third column of the accompanying table, the decoding mask is perforated as shown in FIG. 8 and in the fifth column of the table.

| Normal Binary Number Code | | Permutated Binary Number Code | | Decoding Numbers |
|---|---|---|---|---|
| Decimal | Binary | Binary | Decimal | Binary |
| 0 | 0000 | 0110 | 6 | 0010 |
| 1 | 0001 | 0100 | 4 | 1100 |
| 2 | 0010 | 0000 | 0 | 0110 |
| 3 | 0011 | 1101 | 13 | 1001 |
| 4 | 0100 | 1000 | 8 | 0001 |
| 5 | 0101 | 1111 | 15 | 0111 |
| 6 | 0110 | 0010 | 2 | 0000 |
| 7 | 0111 | 0101 | 5 | 1110 |
| 8 | 1000 | 1011 | 11 | 0100 |
| 9 | 1001 | 0011 | 3 | 1010 |
| 10 | 1010 | 1001 | 9 | 1111 |
| 11 | 1011 | 1100 | 12 | 1000 |
| 12 | 1100 | 0001 | 1 | 1011 |
| 13 | 1101 | 1110 | 14 | 0011 |
| 14 | 1110 | 0111 | 7 | 1101 |
| 15 | 1111 | 1010 | 10 | 0101 |

Referring to the table let it be assumed that at the moment of sampling the complex wave has an amplitude of 9. If a mask perforated in accordance with the normal binary number system as shown in FIG. 2, were used at the transmitter, the deflection of the electron beam of cathode-ray tube 60 corresponding to a sample amplitude at 9 would result in production of pulses representing the binary number 1001. When the permutated coding mask of FIG. 7 is used, however, the light pulses produced for a sample amplitude of 9 represent the binary number 0011 which has a decimal value of 3 as shown in the table. After transmission and integration in the RC translating circuit shown in FIG.3, this signal results in the production of a pulse of amplitude 3 across resistor 180 of FIG. 3. Accordingly, the fourth (the first row corresponds to zero deflection) row of the decoding mask (FIG. 8) is perforated to produce pulses representative of the binary number 1001 which has a decimal value of 9. Thus the original sample amplitude is recovered at the output of photoelectric cell amplifier 201 as a binary number in terms of current pulses. These pulses are applied to a translating circuit identical to that of FIG. 3 and comprising a cathode follower stage 202, having a cathode resistor 203, condenser 204, gated amplifier 205 and condenser discharging tube 206. The operation of this translating circuit is in all respects similar to that of the circuit shown in FIG. 3, the timing pulses for the operation of the gating amplifier 205 and the condenser discharging tube 206 being obtained from relaxation oscillator 184. For this purpose the positive pulses appearing across cathode resistance 187 of the oscillator tube are applied through a delay circuit comprising resistor 208 and condenser 209 to a cathode follower tube 210. The pulses appearing across cathode resistor 211 of cathode follower 210 are applied to the plate of tube 205 and render it conducting, thus gating it on after the final pulse of the code group has acted on condenser 204 to permit application of the integrated pulse to low-pass filter 124 and receiving terminal equipment 125. Positive pulses from the cathode follower 210 are also applied through a delay network 212 to the control grid of tube 206 which is normally biased beyond cut-off and is rendered conductive to discharge condenser 204 immediately after the completion of the gating pulse on tube 205.

While the operation of the communication system as arranged for secrecy transmission has been described in terms of coding and decoding masks using four-digit binary numbers, it will be understood that, as in the case of the normal system shown in FIGS. 1 and 3, binary numbers having any number of digits may be used so long as the transmitting mask, the receiving mask and two RC translating circuits are all arranged for binary numbers having the same number of digits and the several timing circuits are suitably adjusted.

It should also be noted that while the representation in FIG. 2 is on the basis of a four-digital figure and the explanation in connection with FIG. 4 is on a six-digital basis, it is to be understood that these numbers were for exemplary purposes only and any other suitable number may be shown. It will be obvious that for a transmitter of a given number of digital positions, there must be provided a receiver for the same number of digital positions.

It is apparent that many changes may be introduced in the exemplary system as thus far described without departing from the spirit of the invention. For example, certain types of amplifiers have been shown at appropriate points in the system. Obviously, wide latitude is permissible in the choice of type and amount of amplification provided at any point in the system.

As an example of another variation, reference may be made to FIG. 5 in which is shown a special oscilloscope tube having a metallic target electrode 170 located behind a perforated mask 171 bearing perforations according to the binary code. The electron beam passing through the perforations 171 will then yield directly a current flow through resistor 173 the drop across which may then be impressed on a suitable amplifying system. Oscilloscope tubes of this type may be used to replace the masked oscilloscopes 60 and 194, lens 65 and 199 and photocells 66 and 200.

It is to be noted that if the mask 171 is also metallic it then collects electrons in the non-perforated portion and by means of the switch 175 the electrons so collected may be diverted through the resistor 173, whereupon there appears a set of off and on pulses which is the complement of the set obtained from target 170. This is the equivalent to converting low amplitude samples into a code for large amplitude samples and large ones into small ones. Thus a certain measure of privacy may be obtained especially if combined with the shifting of the binary scale mentioned above. The advantages of such a specially constructed tube are obvious but an advantage of the external mask is also obvious in that it is applicable with any of the large variety of standard commercial oscilloscopes.

A source of distortion to be guarded against in this system occurs when the light spot on the oscilloscope of FIG. 2 passes over a horizontal trace that is centered between two of the rows of perforations. The wrong binary number might then be transmitted. The frequency of such occurrences can be reduced by increasing the amount of space between perforated rows in the mask with corresponding decrease in the diameter of the spot on the oscilloscope screen.

What is claimed is:

1. In a communication system for transmitting a message wave, means for sampling the amplitude of said wave at recurrent intervals, a cathode-ray tube, means for deflecting the electron beam thereof in one direction under control of the amplitude of the wave samples, means triggered with the taking of a sample to sweep the electron beam in a direction normal to the sample amplitude deflection, and a coding element arranged to cooperate with said beam to produce as a result of each sweep a group of pulses representing the extent of sample deflection each of said pulse groups comprising the same number *m* of *n* valued pulses representing one of the $m^n$ permutations of said *n* pulses.

2. A communication system comprising apparatus for sampling a message wave at recurrent intervals, a cathode-ray tube associated therewith, the electron beam of which is deflected in one direction by an amount which is a function of the sample amplitude and is triggered with the taking of a sample to sweep at right angles to the first direction, and an element constructed in accordance with a binary permutation code and positioned to intercept said beam to transmit as a result of each sweep a group of *n* bi-valued pulses, said pulse group in each case comprising one of the $2^n$ permutations of said code and representing the sample amplitude.

3. In a communication system for transmitting a message wave, means for sampling the amplitude of the message wave at recurrent intervals, a cathode-ray tube, means for deflecting the electron beam thereof in one direction proportionately to the amplitude of the message wave samples, means triggered with the taking of a sample to sweep the beam in a direction normal to the sample amplitude deflections, and a mask covering the face of the cathode-ray tube and perforated to produce for each sample amplitude deflection a group of *n* on-off light pulses each group representing one of the $2^n$ permutations of said *n* pulses and being characteristic of the extent of sample deflection.

4. In a communication system for transmitting a complex wave, apparatus for sampling the amplitude of a complex wave at recurrent intervals, a cathode-ray oscilloscope associated therewith, a sweep deflection circuit for said oscilloscope which is triggered with the taking of a sample, signal deflection means responsive to said samples to produce deflections at right angles to the sweep deflection and proportional to the sample amplitude, and a masking element associated with the cathode-ray oscilloscope, said element being provided with a plurality of groups of perforations in the direction of the sweep deflection, successive groups corresponding to successive binary numbers of a permutation code wherein each of the code elements is represented by either a perforation or the absence thereof in each of said groups.

5. In a communication system for transmitting a message wave, apparatus for sampling the amplitude of a message wave at recurrent intervals, a cathode-ray oscilloscope associated therewith, the sweep circuit of which is triggered synchronously with the taking of a sample and the signal deflection of which is at right angles to the sweep deflection and is proportional to the sample amplitude, a masking element associated with the cathode-ray tube of the oscilloscope, said element being provided with a plurality of groups of perforations in the direction of the sweep deflection each of said groups comprising a permutation of a fixed number of elements each of which is represented by the presence or absence of a perforation, and the plurality of groups being positioned in the direction of amplitude deflection so that the binary number represented by the permutation of said elements is independent of the extent of amplitude deflection.

6. In a communication system for transmitting a complex wave, apparatus for sampling the amplitude of a complex wave at recurrent intervals, a cathode-ray oscilloscope associated therewith, the sweep circuit of which is triggered synchronously with the taking of a sample and the signal deflection of which is at right angles to the sweep deflection and is a function of the sample amplitude, a masking element associated with the tube, said element being provided with a plurality of groups of perforations in the direction of the sweep deflection, each group comprising one of the permutations of a fixed number of elements each represented by a perforation or the absence thereof and corresponding to a binary number and being positioned in the direction of amplitude deflection so that the binary number corresponding to the group of perforations is independent of the extent of amplitude deflection, means for transmitting these pulse groups to a remote station, and means at the remote station to reconstruct the original wave from the pulse groups.

7. In a communication system for transmitting a complex wave, apparatus for sampling the amplitude of a complex wave at recurrent intervals, a cathode ray oscilloscope associated therewith the sweep circuit of which is triggered with the taking of a sample and the signal deflection of which is at right angles to the sweep deflection and is proportional to the sample amplitude, a masking element associated with the cathode ray tube of the oscilloscope, said element being provided with a plurality of groups of perforations in the direction of the sweep deflection, each group being one permutation of a fixed number of elements each of which is represented by a perforation or the absence thereof and corresponding to a binary number, the plurality of groups being positioned in the direction of amplitude deflection so that the binary number corresponding to a group of perforations is independent of the amplitude causing deflection to the position of that group, a transmission channel for communicating these pulse groups to a remote station, and means at the remote station for converting each pulse group as received into a pulse group representative of the corresponding sample amplitude deflections at the transmitting station in terms of a binary counting system wherein successive binary members correspond to successively greater sample amplitudes.

8. In combination with the communication system of claim 7, means at the remote station for recovering the original complex wave from the pulse groups representing the amplitude deflections at the transmitting station in terms of a normal binary counting system.

9. In a communication system for transmitting a complex wave, apparatus for sampling the amplitude of a complex wave at recurrent intervals, a cathode-ray oscilloscope associated therewith, the sweep circuit of which is triggered with the taking of a sample and the signal deflection of which is at right angles to the sweep deflection and is proportional to the sample amplitude, a masking element associated with the cathode-ray tube of the oscilloscope, said element being provided with a plurality of groups of perforations in the direction of the sweep deflection, each group corresponding to a binary number, the plurality of groups being positioned in the direction of amplitude deflection so that the binary number corresponding to a group of perforations is independent of the amplitude causing deflection to the position of that group, a transmission channel for communicating these pulse groups to a remote station, and means at the remote station for converting each pulse group as received into a pulse group representative of the corresponding sample amplitude deflection at the transmitting station in terms of a normal binary counting system, said means comprising means for converting each of the received pulse groups into a single pulse the amplitude of which is proportional to the binary number which is independent of sample amplitude, a cathode-ray tube the electron beam of which is deflected in one direction proportionately to the amplitude of these pulses and is triggered by each pulse for sweep deflection in a direction normal to the direction of pulse deflection, a coding element arranged to intercept the electron beam and to produce in response to each sweep deflection a group of pulses forming a binary number representative of the original deflection of the electron beam at the transmitted cathode-ray tube in accordance with a counting system wherein successive binary numbers correspond to successively greater complex wave amplitudes.

10. A communication system which comprises apparatus for sampling a complex wave at recurrent intervals, a cathode-ray tube associated therewith, the beam of which is deflected in one direction in proportion to the sample amplitude voltage and is triggered with the taking of the sample to sweep at right angles to the first direction, a conducting anode within the tube to receive the beam, a mask in front of said anode, said mask being provided with a plurality of groups of perforations in the direction of the sweep, each group representing one of the permutations of a fixed number of elements each of which may have either of two values corresponding to a perforation or the absence thereof in said mask and said group corresponding to a binary number.

11. A communication system for transmitting information in the form of complex wave forms which comprises apparatus for sampling complex waves at recurring instants of time, apparatus for generating code groups of pulses, each group representing one permutation of said code and consisting of a uniform numbeir of pulses in which the pulses may be of either one or the other of two different types, apparatus operative under control of the magnitude of said samples for selecting in an arbitrarily and predetermined manner pulse code groups representative of said magnitudes, apparatus for decoding said arbitrarily coded groups and generating pulses having amplitudes which correspond to the binary number represented by each such group, and means for synthesising a complex wave similar to the original complex wave from said pulses of varying magnitude.

12. Apparatus for decoding pulse code groups of a permutation code consisting of a uniform number of pulses of one or the other of two different types wherein the binary number corresponding to each permutation is arbitrarily related to the amplitude of the message wave sample to which that permutation is assigned comprising means for weighting each of the pulses of each code group, apparatus employing said weighted pulse group for determining the magnitude of a single pulse in accordance with the magnitude of the binary number corresponding to the pulse code group, and apparatus for translating said magnitude into a pulse of the magnitude which the original pulse code group was arbitrarily assigned to represent.

13. In a pulse communication system apparatus for translating pulse code groups representing information into other pulse code groups, means for generating a single pulse for each of said first code groups having a magnitude which is a function of the binary number corresponding to said pulse code group, apparatus for generating other pulse code groups and means responsive to the magnitude of said single pulse for selecting a pulse code group representing the same information in accordance with a predetermined and arbitrary schedule.

14. In a pulse communication system in which pulse code groups arbitrarily represent amplitudes of samples of a complex wave, decoding apparatus comprising a condenser and resistance network for weighting and adding together said weighted pulses of each code group, means responsive to said sum for generating a pulse having a magnitude defined by a binary number corresponding to said first pulse code group, apparatus responsive to said single pulse for generating a second pulse code group in which the binary number corresponding to said second pulse code group is a function of the magnitude of the sample represented by said first pulse code group, and equipment for decoding said second pulse code group and generating therefrom a quantity having a magnitude proportional to the magnitude of the sample represented by said first code group.

15. Equipment for decoding code groups of pulses representing magnitudes of a quantity in which each group of pulses is of a uniform number of pulses and in which each pulse may be one or the other of two different types, which comprises apparatus for generating a single pulse for each of said code groups, means for controlling the magnitude of said single pulse in accordance with the binary number corresponding to said code group, apparatus for generating a second series of code groups of pulses, and means for selecting the code group of each group of said second series of code groups of pulses under control of said single pulses which has a corresponding binary number defining the amplitude represented by said first group of pulses, and equipment for decoding said second group of pulses to obtain quantities having magnitudes represented by said first code groups of pulses.

16. In a system for communication by means of code combinations of pulses representative of the signal according to a permutation code of a fixed number of *m*-valued pulses, an electron beam tube, means for establishing a beam of electrons therein, means for sampling the instantaneous amplitude of a signal to be transmitted, means for deflecting said beam in accordance with the amplitude of the samples to any one of a plurality of different positions each corresponding to a different elemental amplitude range, the sum of which represents the total possible amplitude of which the signal is capable, a plurality of electric transmission paths for each beam position, each path including the beam, the number of paths for each position corresponding to the number of code element pulses of said code and the transmission characteristic of each path being proportional to that one of the *m* values of the code elements in the code group representing the particular elemental amplitude range.

References Cited in the file of this patent

UNITED STATES PATENTS

| | | |
|---|---|---|
| 2,189,898 | Hartley | Feb. 13, 1940 |
| 2,256,336 | Beatty | Sept. 16, 1941 |
| 2,272,070 | Reeves | Feb. 3, 1942 |
| 2,313,209 | Valensi | Mar. 9, 1943 |
| 2,435,840 | Morton | Feb. 10, 1948 |
| 2,445,568 | Ferguson | July 20, 1948 |

FOREIGN PATENTS

| | | |
|---|---|---|
| 647,468 | Germany | July 5, 1937 |